(12) United States Patent  (10) Patent No.: US 7,728,453 B2
Evans  (45) Date of Patent: Jun. 1, 2010

(54) OCEAN WAVE ENERGY CONVERTER (OWEC)

(76) Inventor: Andrew Caaius Evans, Flat 2, 5 Strype Street, London (GB) E1 7LG ( * ) Notice: Subject to any disclaimer, the term of this patent is extended or adjusted under 35 U.S.C. 154(b) by 175 days.

(21) Appl. No.: 11/997,588

(22) PCT Filed: Aug. 15, 2005

(86) PCT No.: PCT/GB2005/003205

§ 371 (c)(1),
(2), (4) Date: Feb. 1, 2008

(87) PCT Pub. No.: WO2007/020365

PCT Pub. Date: Feb. 22, 2007

(65) Prior Publication Data

US 2008/0211231 A1    Sep. 4, 2008

(51) Int. Cl.
*F03B 13/00* (2006.01)
(52) U.S. Cl. .......................... 290/53; 60/398
(58) Field of Classification Search .................. 290/53; 60/398
See application file for complete search history.

(56) References Cited

U.S. PATENT DOCUMENTS

| | | | |
|---|---|---|---|
| 1,448,029 A * | 3/1923 | Larry et al. ............... 440/9 |
| 3,064,137 A * | 11/1962 | Corbett, Jr. et al. ......... 290/53 |
| 3,200,255 A * | 8/1965 | Masuda ..................... 290/42 |
| 3,870,893 A * | 3/1975 | Mattera ..................... 290/53 |
| 3,912,938 A * | 10/1975 | Filipenco ................... 290/53 |
| 4,271,668 A | 6/1981 | McCormick et al. |
| 4,754,157 A | 6/1988 | Windle et al. |
| 4,843,250 A * | 6/1989 | Stupakis .................... 290/53 |
| 6,216,455 B1 | 4/2001 | Doleh et al. |
| 6,392,314 B1 | 5/2002 | Dick |
| 7,078,827 B2 * | 7/2006 | Brewington ................ 290/53 |
| 7,355,298 B2 * | 4/2008 | Cook ......................... 290/53 |
| 2003/0226358 A1 | 12/2003 | Gerber et al. |
| 2004/0217597 A1 | 11/2004 | Carroll et al. |
| 2008/0203733 A1 * | 8/2008 | Martindale ................. 290/53 |
| 2009/0072539 A1 * | 3/2009 | Turner et al. ............... 290/53 |

FOREIGN PATENT DOCUMENTS

| | | | |
|---|---|---|---|
| DE | 3922724 A1 * | 1/1991 |
| GB | 2211896 A * | 7/1989 |
| GB | 2410983 A * | 8/2005 |
| GB | 2430711 A * | 4/2007 |

* cited by examiner

*Primary Examiner*—Joseph Waks
(74) *Attorney, Agent, or Firm*—David A. Guerra (57) ABSTRACT

A device consisting of a container which is partially submerged in the sea which may be buoyant and connected to the seabed with cables or mounted on a platform and whose interior is connected to its exterior via pipes where in response to the passing of waves is filled and emptied through these pipes. The force of the water flowing through the pipes causes turbines to rotate thus generating electricity which may be transmitted to land. These turbines may be turbines which rotate in different directions depending on the direction of water flow or turbines which maintain the same direction of rotation irrespective of the direction of water flow.

18 Claims, 11 Drawing Sheets

OCEAN WAVE ENERGY CONVERTER (OWEC)

CROSS-REFERENCE TO RELATED APPLICATIONS

This application is an U.S. national phase application under 35 U.S.C. §371 based upon co-pending International Application No. PCT/GB2005/003205 filed on Aug. 15, 2005. Additionally, this U.S. national phase application claims the benefit of priority of co-pending International Application No. PCT/GB2005/003205 filed on Aug. 15, 2005. The entire disclosures of the prior applications are incorporated herein by reference. The international application was published on Feb. 22, 2007 under Publication No. WO 2007/020365 A1.

BACKGROUND OF THE INVENTION

1. Field of the Invention

The energy of ocean waves is immense and one of the largest renewable resources of energy that can be harvested by mankind. The US DOE estimate that the total power of waves breaking on the world's coastlines is 2 to 3 billion kW. Ocean wave energy is useful to mankind not only due to its energetic potential but also, unlike wind, is less intermittent as it is not reliant on local weather conditions and may travel thousands of miles with little energy dissipation.

2. Description of the Prior Art

There have been many attempts to harvest wave energy. The main problems being:

1) The energy of the waves is greatest in open sea far from shore, for example in some areas off the North Atlantic ridge swell heights can average about 8 meters. Closer to shore, wave energy is dissipated due to bottom friction and diffraction effects. Under deep-water conditions installation of wave energy converters can be difficult and expensive. Shore based wave energy converters are easier to install but have lower theoretical capacity and a greater environmental impact.

2) Many wave energy converters use floats that bob up and down on the wave with relation to the seabed, this movement may be used to generate electricity. However these type of energy converters intrinsically only harvest a small proportion of the wave's energy even if erected in open sea.

3) A wave's energy could be regarded as linear, perpendicular and/or parallel to the gravity of the earth. The energy that is parallel to the earth's gravity can be looked at as alternating in direction. Some of the most common electricity generating methods are based on force moving in one direction that creates a rotation of magnets or coils of wire about a central axis (a generator or turbine). Many methods for converting wave energy to electrical energy, particularly float based systems, have low efficiencies when attempting to convert alternating linear energy to the unidirectional rotation of a generator shaft.

A successful ocean wave energy converter could therefore comprise some or all of the following. It should function whatever the direction of the waves, it should harvest a large amount of the total energy of the wave, it should convert the force of the wave of alternating direction to unidirectional rotation of a generator shaft and it should be relatively simple to construct in open sea and deep water.

SUMMARY OF THE INVENTION

The ocean wave energy converter or OWEC (the device) described here fulfils all these criteria. It is estimated that, assuming 6 meter high waves, a 45 meter diameter device operating at 50% efficiency could be rated at 30 MW of power.

DESCRIPTION OF THE PREFERRED EMBODIMENT

Figure 1:
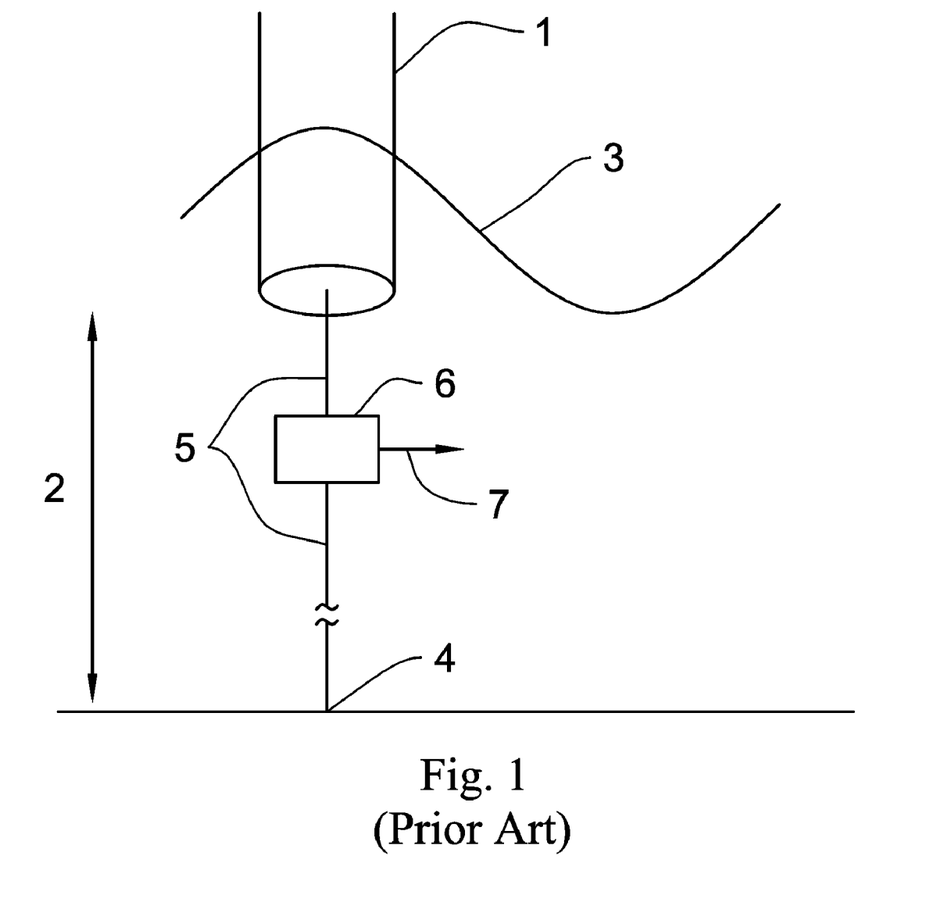
FIG. 1 is a not to scale schematic of an OWEC.
Figure 2:
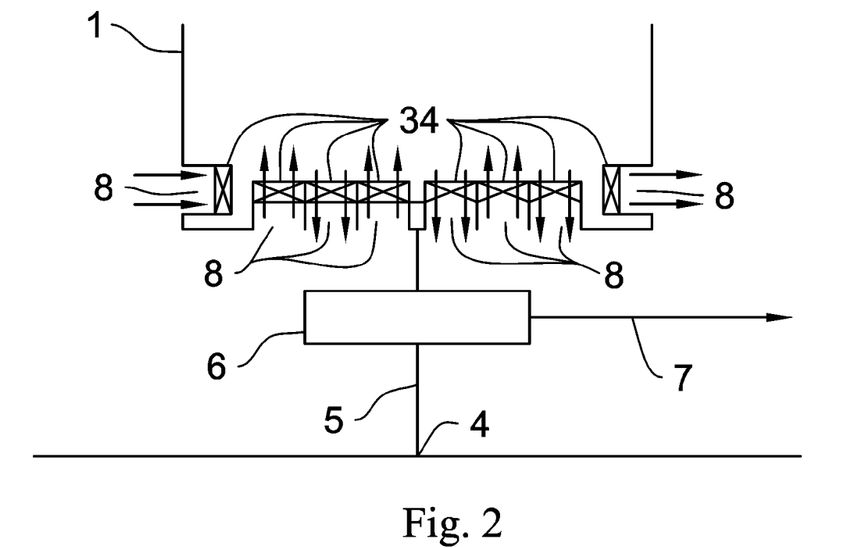
FIGS. 2 and 3 are schematic illustrations of the arrangement of the pipes in an OWEC and how water may flow in and out of the device.
Figure 3:
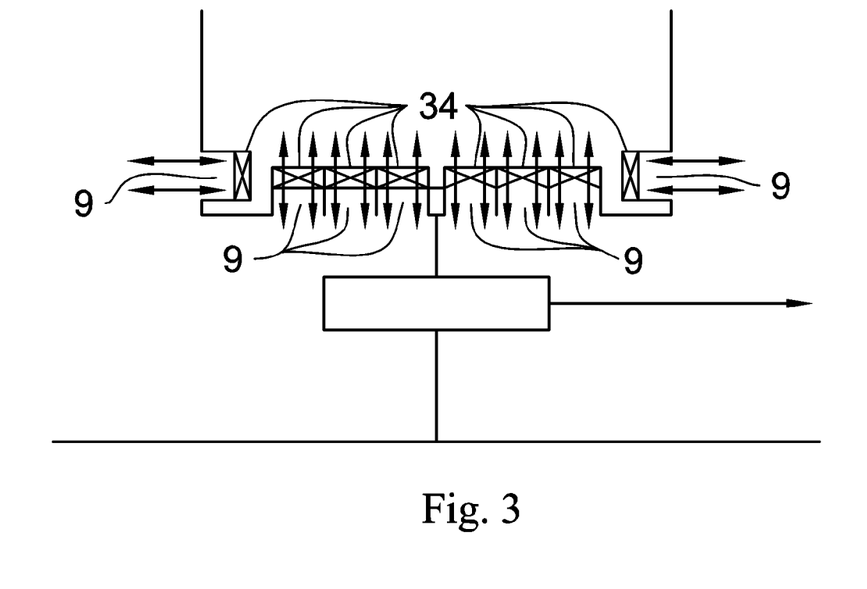

The OWEC (FIG. 1) essentially consists of a container (1) which in operation is partially submersed to a specific height from the seabed (2) such that the waterline (3) varies in height with the passing of waves. The device is connected to the seabed (4) using cables or supports (5). The device may be erected on a platform supported on the seabed or buoy (6). In FIGS. 2 and 3, the container is fitted with one or a number of pipes (8 or 9) that facilitate the inflow and outflow of seawater between the container's interior and the sea. As waves pass the container it is filled and emptied through these pipes. This is due to a differential created between the water on the inside of the device and the water on the outside of the device due to the device's buoyancy, that it is connected by cables to the seabed or that it is erected on a platform. Different pipes (8) could be used for the inflow and outflow (FIG. 2) or the same pipe (9) could facilitate both the inflow and outflow (FIG. 3), the arrows denoting the direction of flow. Due to the characteristics of ocean waves and that maximum differential is desirable, the pipes will primarily be located in the base of the container. Pipes may also be located in the devices sides which are more perpendicular to the plane of the sea. The pipe or pipes are fitted with a turbine or turbines. Each turbine rotates about a central axis as seawater flows through it. The flow of seawater could be regulated by valves. The rotation induces an electric current. The electricity may then be transmitted to land via cables (7).

The emptying or filling of the container may be regulated using valves to allow a build up of head to drive the turbines, though regulation of flow is not necessary for all operation as a natural head may be created by the waterline variation and restriction of water flow as it passes through the pipes. The creation of a head by regulating flow to power the turbines may be considered as a four step process and may be considered to illustrate the general process by which the OWEC functions. In FIGS. 4-7 the arrow denotes the horizontal movement of a wave over time.

Figure 4:
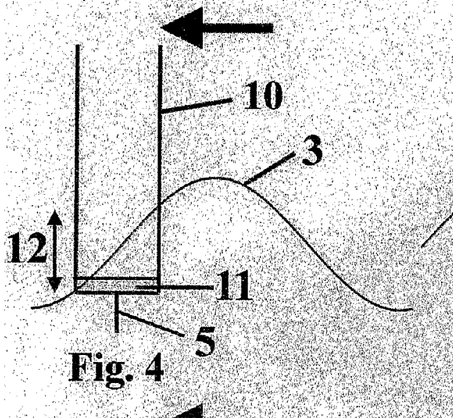
FIGS. 4-7 are flow diagrams detailing the sequence of filling and emptying of an OWEC.

In FIG. 4, the OWEC (10) is in a closed state with a lower amount of water (11) in its base. A head (12) is building up between the base of the container and the wave (3). At the optimum moment water is allowed to flow into the container.

Figure 5:
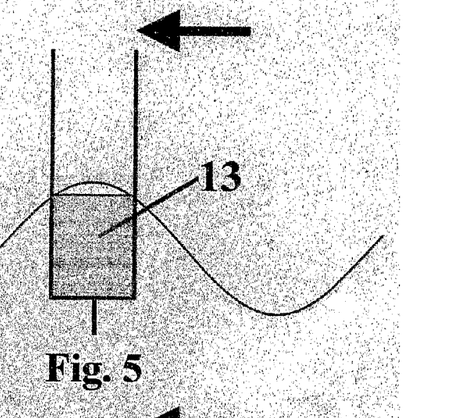

In FIG. 5, the water (13) has filled the container, it is then retained in there.

Figure 6:
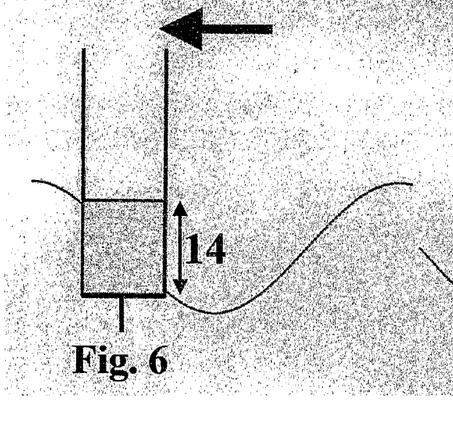
Figure 7:
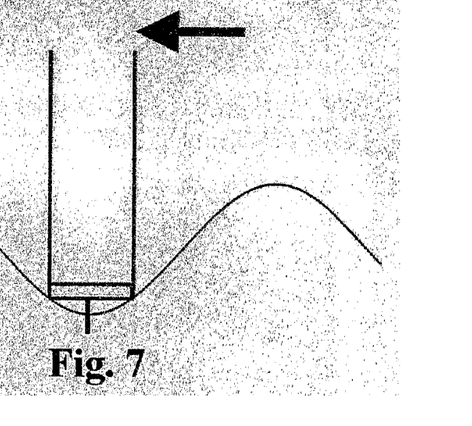

In FIG. 6, a head (14) has been generated by the continuation of the wave past the container. At the optimum moment this water is released resulting in the situation in FIG. 7. The cycle then starts again.

The flow into and out of the device is converted into electrical energy using turbines. These turbines may be of the propeller variety. There are four arrangements of turbines possible. In FIG. 2, separate pipes may be used for the inflow and outflow of water and these pipes may be fitted with turbines which are designed for flow in only one direction. The disadvantage of this arrangement is that each turbine is only in operation for either the inflow or outflow of seawater.

Figure 8:
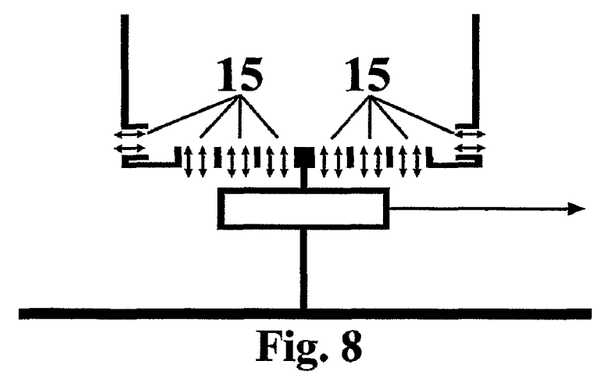
FIGS. 8-10 are schematic illustrations detailing the flow and turbine types available in an OWEC.

In FIG. 8, the same pipe may be used for both the inflow and outflow of water and may be fitted with a turbine that changes rotation direction dependent on the direction of water flow (15). This gives a greater surface area for the water to flow through, however, the disadvantage of this arrangement is that much of the energy of the water flow is used to change the direction of rotation of the propeller.

Figure 9:
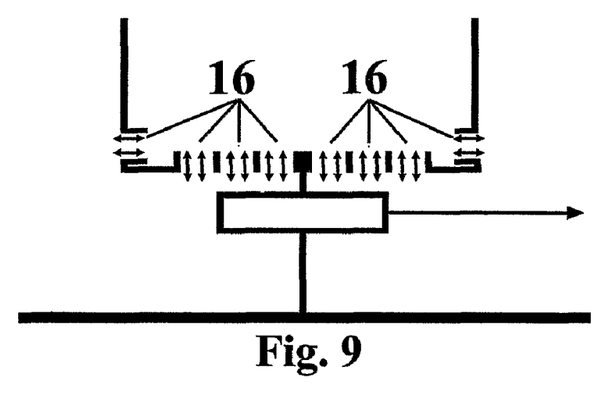
Figure 11:
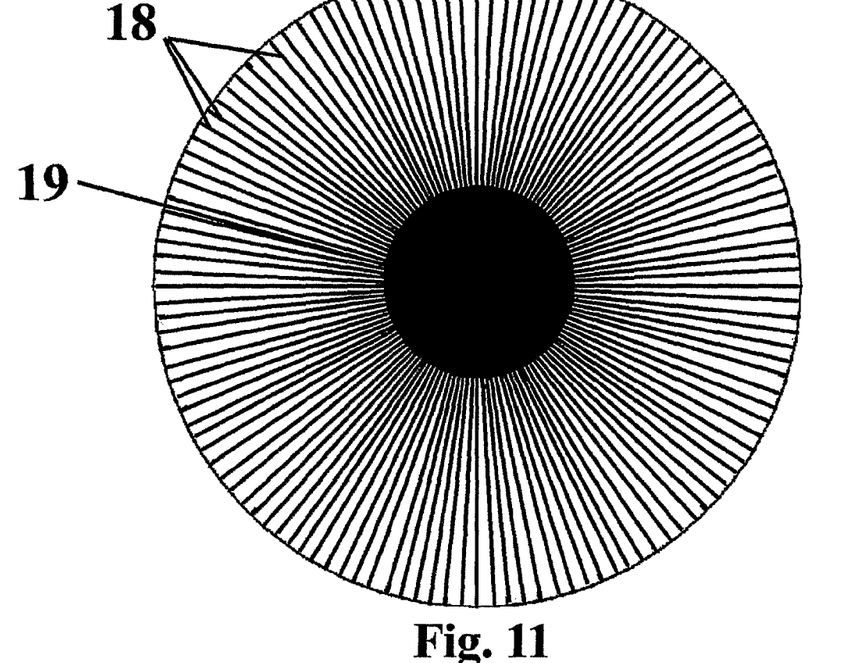
FIG. 11 is a top view of a possible turbine (switching alternating flow turbine) in an OWEC.
Figure 12:
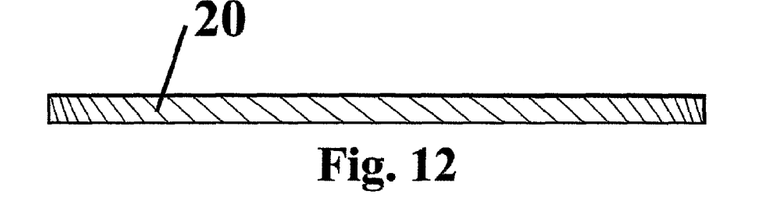
FIGS. 12 and 13 are side views of two possible different blade orientations in a switching alternating flow turbine.
Figure 13:
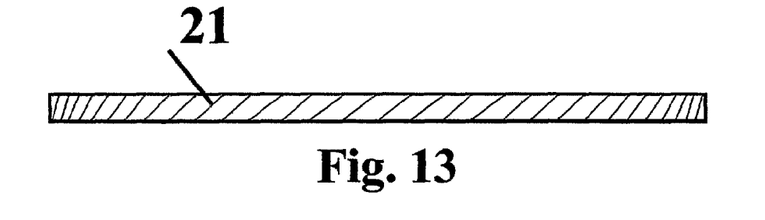

In FIG. 9, the same pipe is used for inflow and outflow and uses a turbine whose blades switch orientation, by changing angle, dependent on flow direction (16). This also allows the turbine to maintain the same direction of rotation regardless of the direction of water flow. This type of turbine will be known as a switching alternating flow turbine or sAFT. In FIG. 11 an example of a sAFT is shown where the turbine consists of blades (18) arranged about a central axis (19): FIG. 12 illustrates the blade orientation (20) during the inflow stage, whilst FIG. 13 illustrates the blade orientation (21) during the outflow stage. This allows the maximum surface area for the flow to pass through. As the orientation of blades is opposing dependent on the direction of flow, the inflow of water through the blades in one orientation and the outflow of water through the blades in another orientation results in rotation about the same axis, in the same direction.

These rotations can be used to generate electricity.

Figure 10:
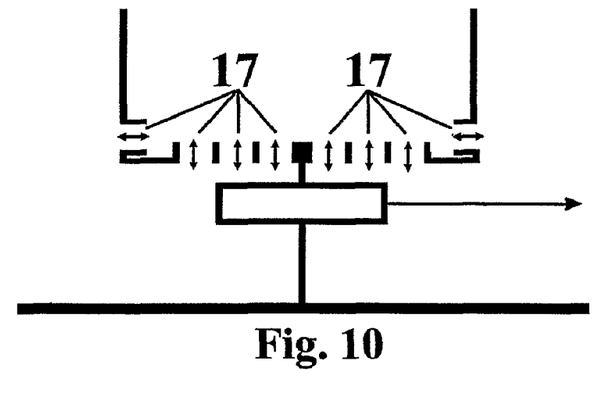
Figure 14:
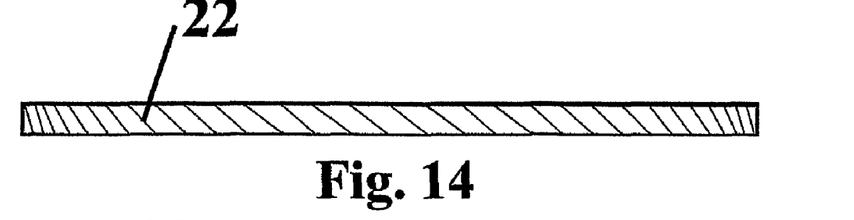
FIGS. 14 and 15 are side views of possible blade orientations in an alternating flow turbine.
Figure 15:
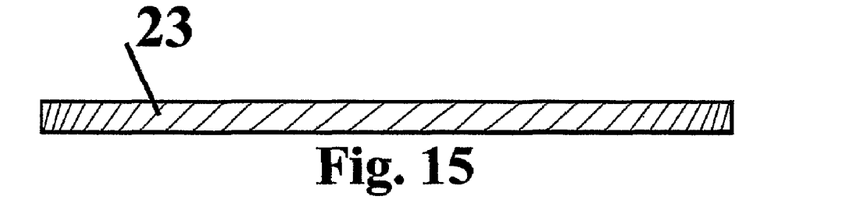
Figure 16:
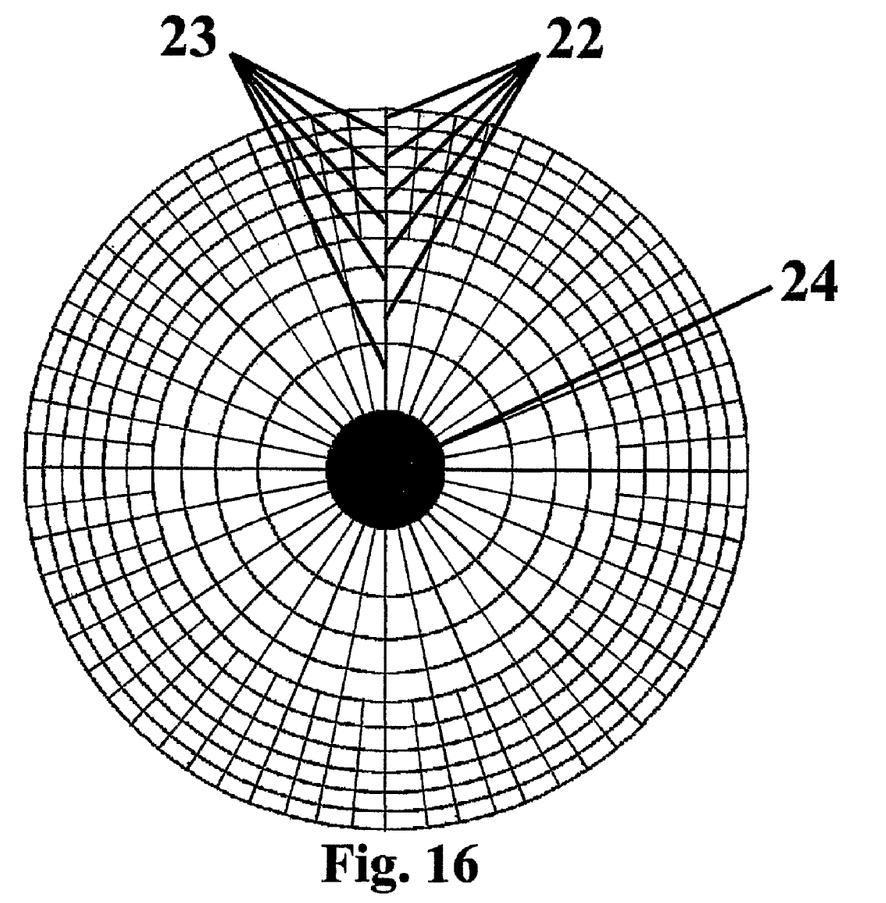
FIG. 16 is a top view of a possible turbine in an OWEC (alternating flow turbine)
Figure 17:
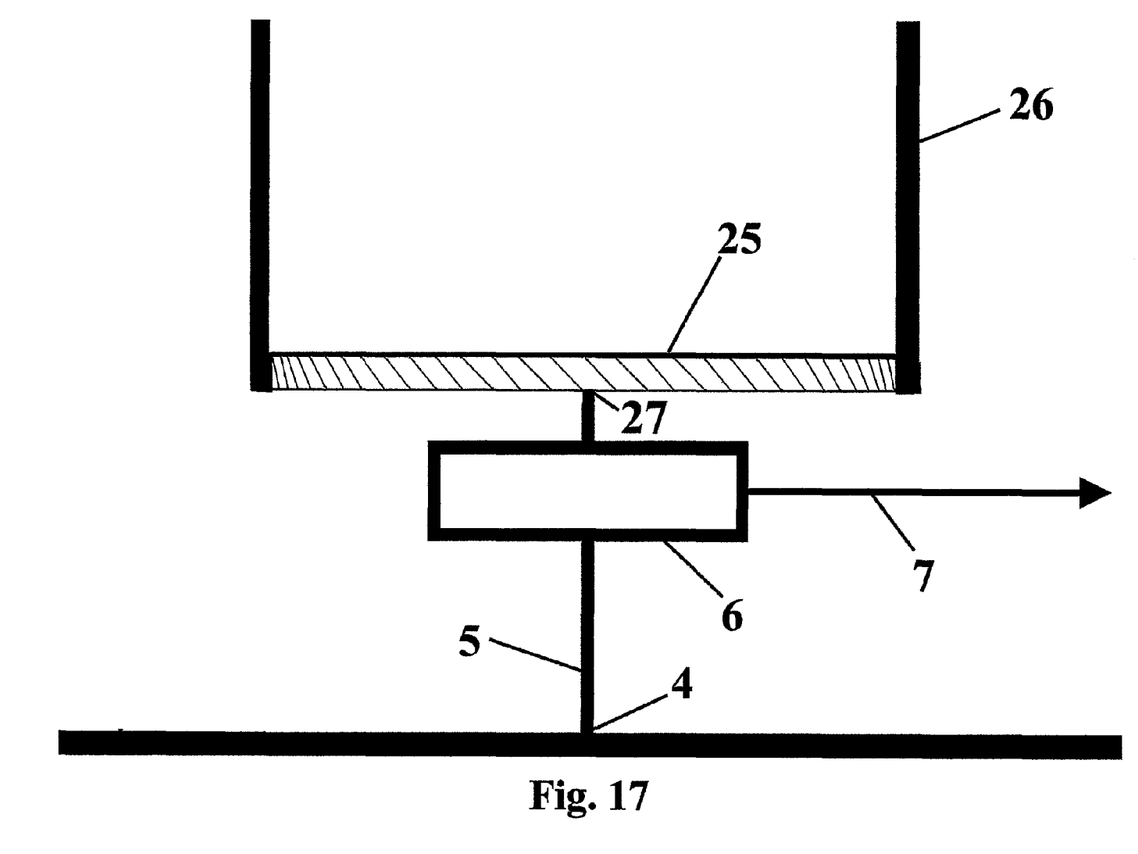
FIG. 17 is a schematic of spinning OWEC.
Figure 18:
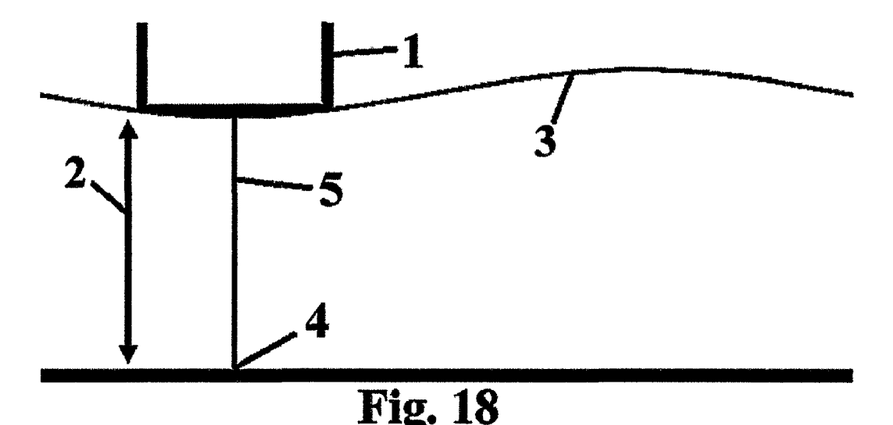
FIGS. 18-21 are schematics detailing different configurations of regulating the buoyancy of an OWEC.
Figure 19:
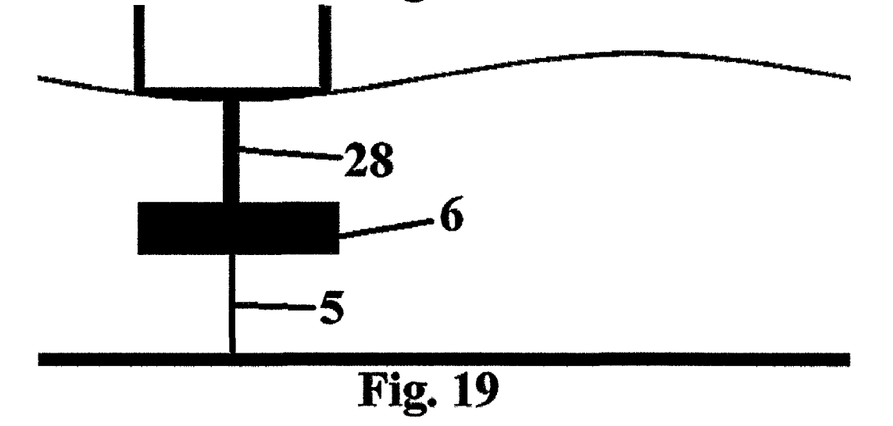
Figure 20:
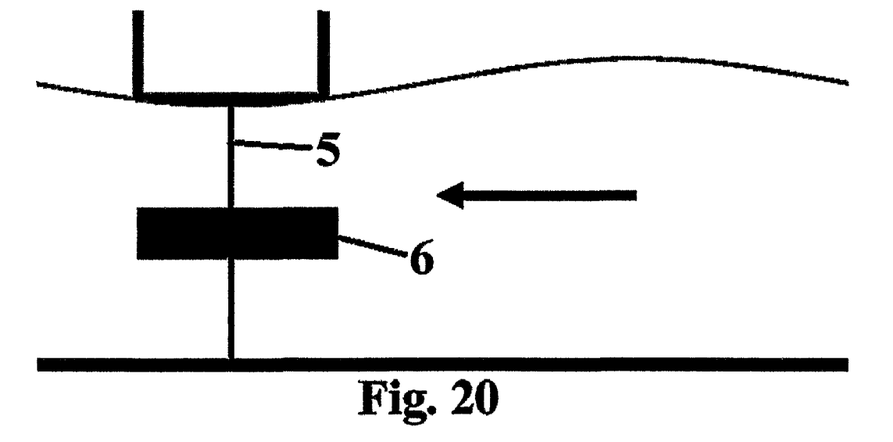
Figure 21:
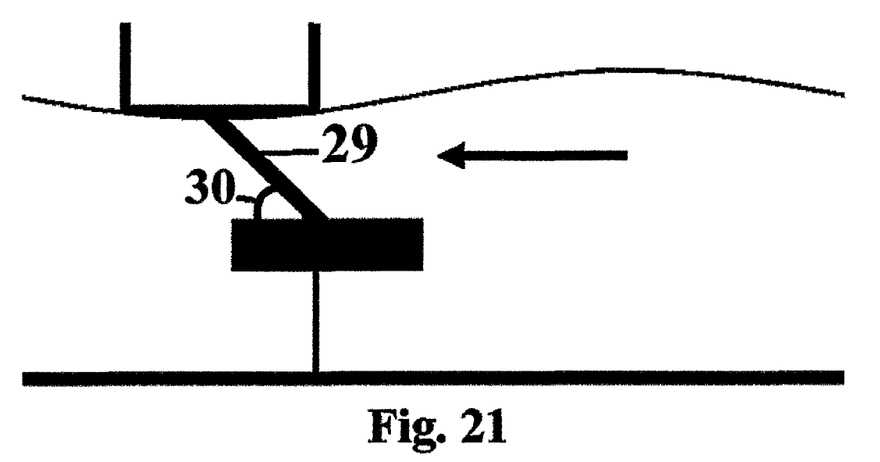

In FIG. 10, the same pipe for both inflow and outflow and is fitted with a particular type of turbine that maintains the same direction of spin regardless of the direction of water flow (17). This consists of two sets of opposing blades arranged about a common axis. An example of this is shown in FIGS. 14-16. This type of turbine will be known as the alternating flow turbine or AFT. In this case the AFT consists of concentric bands of alternately opposing blades (22 and 23) about a single axis (24). However, sets of opposing blades may be arranged in any configuration. The flow through each set of blades is regulated by using valves. These valves may have an open and closed position. As water flows in one direction it is allowed to flow past one set of blades, the other set being closed. As water flows in the other direction it is allowed to flow past the opposing set of blades, the first set of blades being closed. In stages in which a build up of head is required, both sets of blades may be closed. As the orientation of each set of blades is opposing, the inflow of water through one set and the outflow of water through the other set results in rotation about the same axis, in the same direction. Only half the total flow is possible with the AFT than with the sAFT turbine These rotations can be used to generate electricity. Any number of pipes and/or combinations of turbines may be fitted as to allow flow into and out of the container and result in electricity generation. Alternatively a single turbine (25) may be fitted in the base of the cylinder which is composed of a circular section (26) (FIG. 17). In this case, in operation, the entire device may rotate about a central axis (27). This subclass of OWEC is to be known as the spinning OWEC or sOWEC. In order for the OWEC to work at maximum efficiency its height in the waterline must be carefully regulated. The OWEC must have sufficient buoyancy to reduce the variation in the height the device sits in the waterline as a result of emptying or filling with water. As the device would normally be erected in deep water it may not be possible to erect it on top of a platform supported on the seabed. In these cases the container (1) will either use its own buoyancy (FIG. 18) or be erected using a support (28) on top of a buoy (6) (FIG. 19), whilst using a tense cable (5) connected to the seabed (4) to allow the device to remain at an optimal, approximately constant distance to the seabed (2). The tension in the cable or the height of the support may be varied to attain the required height from the seabed. A platform or buoy may be used to house electrical generation and transmission equipment.

Figure 22:
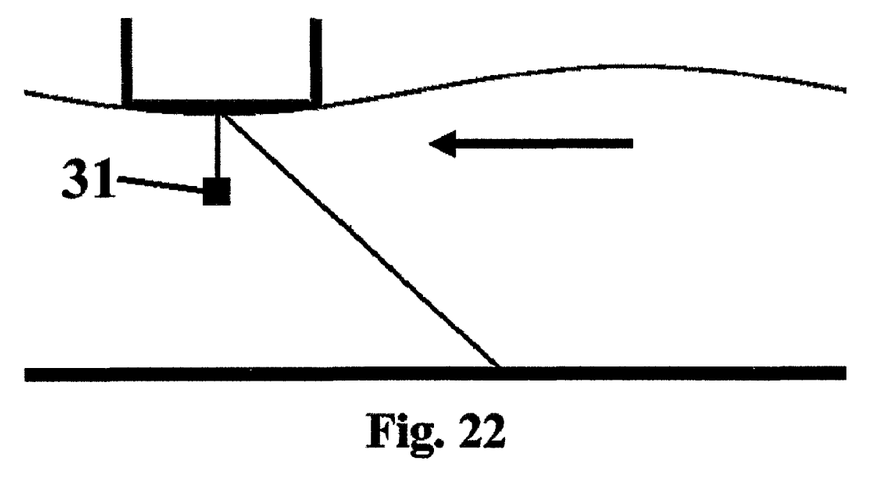
FIGS. 22-24 are schematics detailing the use of a keel with an OWEC.
Figure 23:
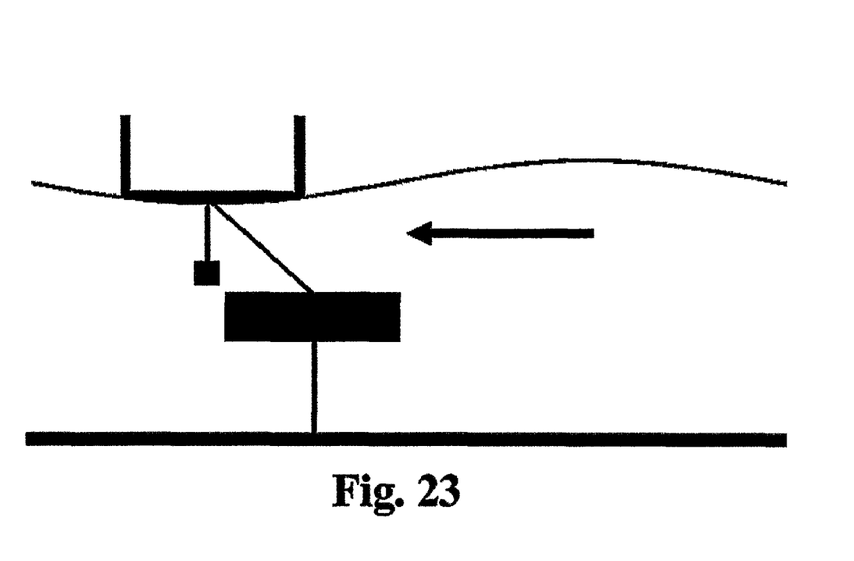
Figure 24:
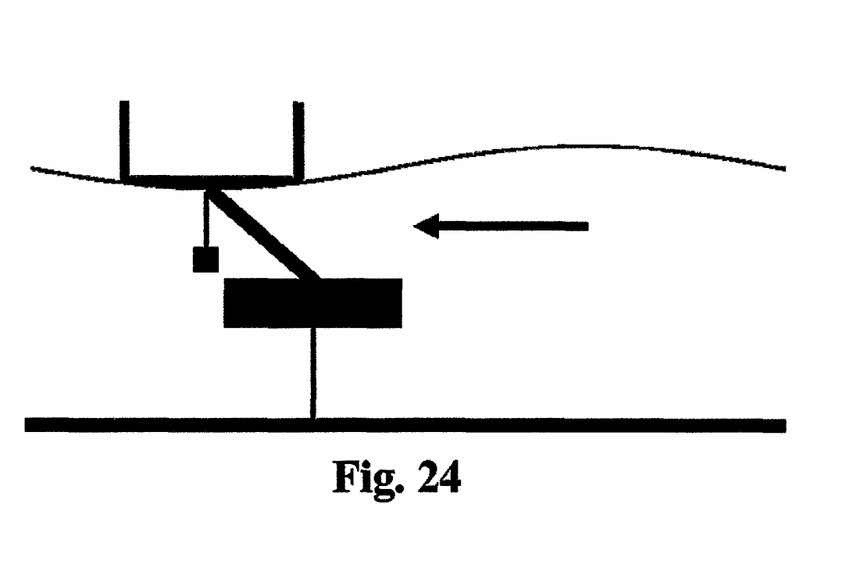
Figure 25:
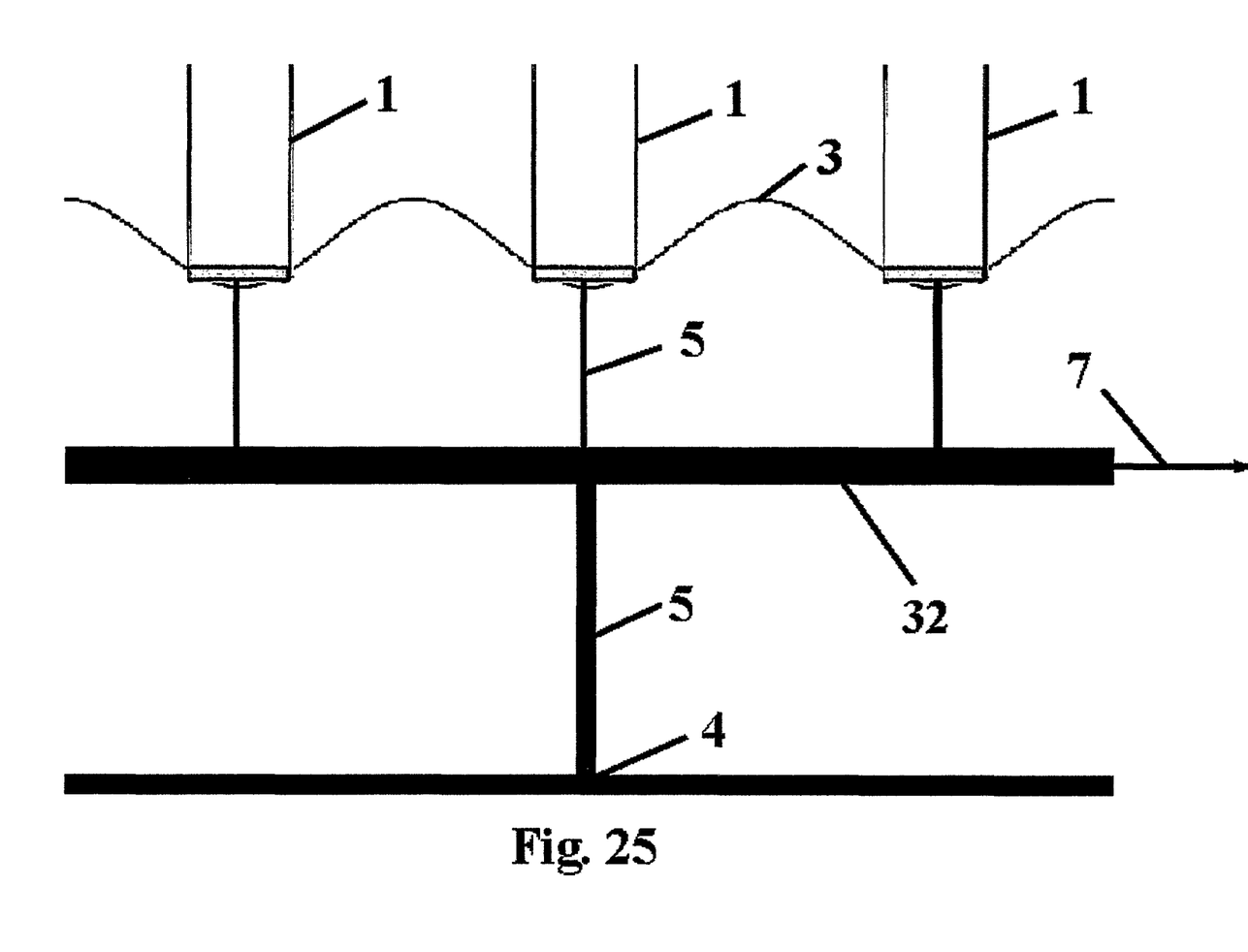
FIG. 25 is a schematic detailing the use of a single buoy or platform with multiple OWECs.

Horizontal forces from passing waves and wind as well as underwater currents may also effect the height that the device sits in the water. In FIGS. 20-24 these forces are denoted by an arrow. If horizontal forces are significant and/or variable such that they may effect the height of the OWEC in the water the device may be erected on a buoy (6) (FIG. 20) which has sufficient buoyancy to counter much if these horizontal forces and the buoyancy of the container and tension in the cable (5) may by used to retain the desired height. If the device is erected on a buoy or platform a support (29) at an angle (30) to the normal (FIG. 21) may be employed and height from the seabed regulated by varying this angle. The use of a keel (31) may be employed the keep the device upright (FIGS. 22-24). In operation many OWECs may be erected on a single buoy or platform (32) (FIG. 25).

The use of remote sensing of wave characteristics may allow more efficient regulation of wave inflow and outflow from an OWEC.

The invention claimed is:

1. A wave energy converter system being partially submerged in open sea and maintained at an approximately constant distance to the seabed, said wave energy converter system comprising:
    a container having an interior, an exterior, an open top, and a base, said interior being connected to said exterior via a plurality of pipes primarily located in said base, each of said pipes being fitted with a turbine; and
    a support attachable to said container and the seabed;
    wherein in response to a rise in water level relative to said container due to the passing of a wave peak, a differential in height between the water inside said container and the water on the outside of said container is created due to said container being connected to the seabed with said support such that water flows into said container through said pipes and is retained inside and in response to a drop in water level relative to said container due to the passing of a wave trough, a differential in height between the water inside said container and the water on the outside of said container is created due to said container being buoyant such that water flows out of said container through said pipes.

2. The wave energy converter system as set forth in claim 1, wherein each of said pipes further comprising at least one valve for regulating the flow of water through said pipe such that an optimal head is created prior to the inflow or outflow of water into or out of said container.

3. The wave energy converter system as set forth in claim 1 further comprising a platform attachable to said container, said support being attachable to said platform.

4. The wave energy converter system as set forth in claim 1, wherein the tension in said support connecting said container to the seabed is adjustable to adjust the height that said container sits in the water.

5. The wave energy converter system as set forth in claim 1, wherein said container is mountable on a buoy with a support, said support being attachable to said container.

6. The wave energy converter system as set forth in claim 1 further comprising a keel attachable to said container, said keel being adapted to maintain said container in an upright position.

7. The wave energy converter system as set forth in claim 1, wherein multiple said containers are mountable on a support structure selected from the group consisting of a buoy, a platform, and a keel.

8. The wave energy converter system as set forth in claim 1, wherein said pipes being arranged in at least two sets of plurality of pipes, one set of said pipes being adapted to allow the water to flow in to said interior of said container, and the other set of said pipes being adapted to allow the water to flow out from said interior of said container.

9. The wave energy converter system as set forth in claim 1, wherein said turbine changes rotation direction dependent on the direction of water flow.

10. The wave energy converter system as set forth in claim 1, wherein said turbine maintains the same direction of rotation regardless of the direction of water flow, said turbine being composed of blades arranged about a central axis and that are adapted to switch orientation, by changing angle, dependent on the direction of water flow.

11. The wave energy converter system as set forth in claim 1, wherein said turbine is a fixed blade turbine composed of two sets of opposing blades orientated around the same axis, and wherein the water is only allowed to flow through either set of blades dependent on flow direction, the force of which being used to cause the rotation of said turbine resulting in the generation of electricity.

12. The wave energy converter system as set forth in claim 1, wherein said turbine is mountable to said base of said container having circular section, said container and said turbine being adapted to rotate about a central axis.

13. A wave energy converter system being partially submerged in open sea and maintained at an approximately constant distance to the seabed, said wave energy converter system comprising:
 a container having an interior, an exterior, an open top, and a base, said interior being connected to said exterior via at least one pipe primarily located in said base, said pipe being fitted with a turbine; and
 a support attachable to said container and the seabed, the tension in said support being adjustable to adjust the height that said container sits in the water;
 wherein in response to a rise in water level relative to said container due to the passing of a wave peak, a differential in height between the water inside said container and the water on the outside of said container is created due to said container being connected to the seabed with said support such that water flows into said container through said pipe and is retained inside and in response to a drop in water level relative to said container due to the passing of a wave trough, a differential in height between the water inside said container and the water on the outside of said container is created due to said container being buoyant such that water flows out of said container through said pipe;
 wherein said pipe further comprising at least one valve adapted to regulate the flow of water through said pipe such that an optimal head is created prior to the inflow or outflow of water into or out of said container, the force of which being used to cause the rotation of said turbine resulting in the generation of electricity.

14. The wave energy converter system as set forth in claim 13, wherein said turbine is selected from the group consisting of a fixed blade turbine being composed of two sets of opposing blades orientated around the same axis where water is only allowed to flow through either set of blades dependent on flow direction, a fixed blade turbine which rotates at different directions dependent on the direction of flow, and a turbine which rotates the same direction regardless of direction of flow by switching blade orientation dependent on direction of water flow.

15. The wave energy converter system as set forth in claim 14 further comprising a platform attachable to said container, said support being attachable to said platform.

16. The wave energy converter system as set forth in claim 14 further comprising a buoy having a support, said support of said buoy being adjustable in height and attachable to said container.

17. The wave energy converter system as set forth in claim 14 further comprising a keel attachable to said container, said keel being adapted to maintain said container in an upright position.

18. A wave energy converter system comprising:
 a container having an interior, an exterior, an open top, and a base, said interior being connected to said exterior via a plurality of pipes primarily located in said base;
 a turbine mountable within each of said pipes, said turbine being a fixed blade turbine composed of two sets of opposing blades orientated around the same axis, and wherein the water is only allowed to flow through either set of blades dependent on flow direction, the force of which being used to cause the rotation of said turbine resulting in the generation of electricity;
 a support attachable to said container and the seabed, the tension in said support being adjustable to adjust the height that said container sits in the water;
 wherein in response to a rise in water level relative to said container due to the passing of a wave peak, a differential in height between the water inside said container and the water on the outside of said container is created due to said container being connected to the seabed with said support such that water flows into said container through said pipes and is retained inside and in response to a drop in water level relative to said container due to the passing of a wave trough, a differential in height between the water inside said container and the water on the outside of said container is created due to said container being buoyant such that water flows out of said container through said pipes;
 wherein said pipes further comprising at least one valve adapted to regulate the flow of water through said pipe such that an optimal head is created prior to the inflow or outflow of water into or out of said container, the force of which being used to cause the rotation of said turbine resulting in the generation of electricity.

* * * * *